Patented July 1, 1941

2,247,735

UNITED STATES PATENT OFFICE 2,247,735

CONDENSATION PRODUCTS

Georg Spielberger and Otto Bayer, Leverkusen-I. G. Werk, and Wilhelm Bunge, Leverkusen-Wiesdorf, Rhine, Germany, assignors, by mesne assignments, to General Aniline & Film Corporation, New York, N. Y., a corporation of Delaware No Drawing. Application April 18, 1939, Serial No. 268,520. In Germany May 14, 1938

4 Claims. (Cl. 260—43)

The present invention relates to new condensation products and to a process of preparing the same.

We have found that new and valuable condensation products can be easily obtained by causing formaldehyde or compounds which are capable of splitting off formaldehyde to react upon mixtures of aromatic hydroxy carboxylic acids on the one hand and aromatic hydrocarbons or the alkyl or halogen substitution products thereof on the other hand. The even course of the reaction is all the more surprising as aromatic hydrocarbons as well as the alkyl or halogen substitution products thereof are known to show a very low tendency of reacting with formaldehyde. The process is preferably performed in an aqueous acid medium, such starting materials being preferred as are capable of being easily dispersed or dissolved in the reaction medium or of being easily molten. As a matter of fact the reaction can be performed in the presence of additional solvents or agents promoting the conversion of the starting materials into a molten state. As a modification of our process described above the reaction can be performed in the presence of further compounds which are capable of reacting with formaldehyde. Also mixtures of various aromatic hydroxy carboxylic acids and/or mixtures of various aromatic hydrocarbons (and substitution products thereof) of the character described can be employed.

Examples for suitable aromatic hydroxy carboxylic acids are salicylic acid and p-hydroxy benzoic acid. As examples for the other type of starting materials there may be mentioned naphthalene, alkylated naphthalenes, halogenated naphthalenes, tar-distillation fractions and such fractions of the distillation of petroleum as are rich in aromatic hydrocarbons, furthermore, p-methylisopropyl benzene, iso-octyl benzene and anthracene derivatives.

Part of the reaction products which are obtainable in accordance with our present invention are soluble in a sodium carbonate solution and in alcohol or acetone; they can be employed as a substitute for shellac or as textile assistants. This is particularly true in case of products which are rich in carboxylic acid groups. Furthermore, many of our new products are characterized by a high softening point so that they are suitable for being employed as lacquer raw materials and as glue for the preparation of paper. Part of our new products are compatible with cellulose esters. As a matter of fact the resulting resins can be subjected to further transformations, f. i. to esterification, alkylation, hydrogenation or sulfonation.

The following examples illustrate the present invention without, however, restricting it thereto the parts being by weight:

Example 1

64 parts of naphthalene, 136 parts of salicylic acid, 200 parts of a 33% formaldehyde solution and 200 parts of concentrated hydrochloric acid are heated to boiling while refluxing for three hours. The resin thus formed is separated from the aqueous layer and small traces of unchanged naphthalene are removed. The resin is then ground for removing some acid still adhering thereto, rinsed with water and dried. The resin thus obtained is easily soluble in alcohol, acetone and in an aqueous sodium carbonate and borax solution. It shows the softening point of 93° according to Krämer-Sarnow and an acid number of 221.

Example 2

When working according to Example 1 with 150 parts of formaldehyde and 100 parts of hydrochloric acid, there is obtained in a similar manner a resin of the same properties the softening point of which being somewhat lower.

Example 3

256 parts of naphthalene, 138 parts of salicylic acid, 300 parts of a 33% formaldehyde solution and 200 parts of concentrated hydrochloric acid are heated to boiling for 48 hours while stirring and while refluxing. On removing the unchanged naphthalene by evaporating a resin is formed which is ground, rinsed and molten in vacuo. 320 parts of a hard clear, yellowish resin of a high softening point are thus obtained which is clearly soluble in a sodium carbonate solution as well as in acetone and methyl glycol ether acetate, it being only scarcely soluble, however, in alcohol.

Example 4

192 parts of naphthalene, 69 parts of salicylic acid, 200 parts of a 33% formaldehyde solution and 130 parts of concentrated hydrochloric acid are condensed for 72 hours at 100° while stirring. After working up as described in the preceding examples 195 parts of a hard brown clear resin of a high melting point are obtained which is soluble in acetone, insoluble, however, in alkalies.

Example 5

90 parts of phenanthrene, 138 parts of salicylic acid, 200 parts of a 33% formaldehyde solution and 200 parts of concentrated hydrochloric acid are condensed by heating for three hours to boiling while stirring. On working up in the usual manner, a greenish colored resin of high melting point is obtained which is soluble in alcohol and sodium carbonate solution.

Example 6

64 parts of naphthalene, 85 parts of diphenyl ether, 138 parts of salicylic acid, 200 parts of a 30% formaldehyde solution and 150 parts of concentrated hydrochloric acid are condensed for 6 hours at 100°. On working up in the usual manner 240 parts of a hard clear resin are obtained which is easily soluble in sodium carbonate solution, caustic soda lye, borax, alcohol, acetone and esters.

Example 7

170 parts of isopropyl naphthalene, 138 parts of salicylic acid, 200 parts of a 30% formaldehyde solution, and 200 parts of concentrated hydrochloric acid are condensed for 16 hours at 100°. On working up in the usual manner 290 parts of a brownish resin are obtained the sodium carbonate solution of which shows an opaline luster and which yields clear solutions in alcohol and acetone.

Example 8

162 parts of α-chloronaphthalene, 138 parts of salicylic acid, 200 parts of a 30% formaldehyde solution and 150 parts of concentrated hydrochloric acid are condensed for 14 hours at 100°. When working up as described above 220 parts of a hard resin of high melting point are obtained.

Example 9

156 parts of ethyl naphthalene, 138 parts of salicylic acid, 200 parts of a 30% formaldehyde solution and 150 parts of concentrated hydrochloric acid are condensed for 6 hours at 100°. On working up in the usual manner 250 parts of a hard brownish resin are obtained which is easily soluble in sodium carbonate solution.

Example 10

134 parts of methyl-p-isopropyl benzene, 138 parts of salicylic acid, 200 parts of a 30% formaldehyde solution and 200 parts of concentrated hydrochloric acid are condensed in the usual manner, a resin which is soluble in alcohol and sodium carbonate solution being thus obtained.

We claim:

1. The process which comprises causing formaldehyde to react upon a mixture of aromatic hydroxy carboxylic acids having the hydroxy and the carboxylic acid group directly attached to an aromatic nucleus and of aromatic compounds selected from the group consisting of aromatic hydrocarbons and the alkyl and halogen substitution products thereof.

2. The process as claimed in claim 1 wherein the reaction is performed in an acid medium.

3. The process which comprises causing formaldehyde to react upon a mixture of salicylic acid and naphthalene.

4. The products which are substantially identical with those obtained by the process as claimed in claim 1 these products being soluble in alkalies and capable of being employed as a substitute for shellac.

GEORG SPIELBERGER.
OTTO BAYER.
WILHELM BUNGE.